US010005512B2

(12) United States Patent
Sime

(10) Patent No.: US 10,005,512 B2
(45) Date of Patent: Jun. 26, 2018

(54) ROTATABLE BICYCLE STEM ASSEMBLY

(71) Applicant: Adam Sime, North Vancouver (CA)

(72) Inventor: Adam Sime, North Vancouver (CA)

(73) Assignee: Adam Sime, North Vancouver (CA)

( * ) Notice: Subject to any disclaimer, the term of this patent is extended or adjusted under 35 U.S.C. 154(b) by 381 days.

(21) Appl. No.: 14/792,325

(22) Filed: Jul. 6, 2015

(65) Prior Publication Data

US 2017/0008597 A1 Jan. 12, 2017

(51) Int. Cl.
*B62K 21/16* (2006.01)

(52) U.S. Cl.
CPC .................................. *B62K 21/16* (2013.01)

(58) Field of Classification Search
CPC ........ B62K 21/16; B62K 21/18; B62K 21/22; B62K 21/24; Y10T 403/7026; Y10T 403/7031; Y10T 403/32975; Y10T 403/32983; Y10T 403/32418; Y10T 403/32426
See application file for complete search history.

(56) References Cited

U.S. PATENT DOCUMENTS

| 6,941,835 B2 | 9/2005 | Ying | |
|---|---|---|---|
| 6,968,754 B2 | 11/2005 | Bandarra | |
| 7,296,813 B2 | 11/2007 | Montague | |
| 2006/0130605 A1* | 6/2006 | Chen | B62K 21/12 |
| | | | 74/551.1 |
| 2007/0202456 A1* | 8/2007 | Chen | B62K 21/16 |
| | | | 433/1 |
| 2012/0125145 A1 | 5/2012 | VanderVeen | |
| 2013/0319169 A1 | 12/2013 | Savard | |
| 2015/0050073 A1 | 2/2015 | Forgrave | |

FOREIGN PATENT DOCUMENTS

| CN | 202923815 U | 5/2013 | |
|---|---|---|---|
| CN | 103569287 A | 2/2014 | |
| CN | 204197195 U | 3/2015 | |
| DE | 202010015272 U1 | 2/2011 | |
| FR | 2808495 A3 * | 11/2001 | ............. B62K 21/18 |
| GB | 2487584 A | 8/2012 | |

(Continued)

OTHER PUBLICATIONS

"Hallway Bike Storage—Folding Handlebars—Bike Lights Review", accessed Mar. 26, 2015 (4 pages). <http://www.bikelightsreview.com/miscellaneous/folding-handlebars>.

(Continued)

*Primary Examiner* — Jonathan P Masinick

(57) ABSTRACT

A rotatable stem assembly for a bicycle is provided. The assembly includes: a tubular sleeve configured to fit over a steerer tube of the bicycle, an outer surface of the sleeve having a plurality of first splines and first channels; and a stem including a first bore for receiving the sleeve, the first bore having an inner surface with a plurality of second splines and second channels configured for mating engagement with the plurality of first splines and first channels; wherein the first and second splines and channels are matingly engageable in a riding configuration and in a storage configuration, wherein in the riding configuration the stem relative to the sleeve is rotationally perpendicular with the stem relative to the sleeve in the storage configuration.

16 Claims, 4 Drawing Sheets

(56) References Cited

FOREIGN PATENT DOCUMENTS

| WO | 03/004343 A1 | 1/2003 | |
|---|---|---|---|
| WO | 2009/053272 A1 | 4/2009 | |
| WO | WO-2012005610 A2 * | 1/2012 | ............. B62K 19/32 |
| WO | WO-2013131254 A1 * | 9/2013 | ............. B62K 21/16 |

OTHER PUBLICATIONS

Lacreau, Alejanddro—Kickstarter, "Flipphandle—makes bike storage a snapp!" Accessed Mar. 26, 2015 (5 pages). <http://www.kickstarter.com/projects/flipphandle/flipphandle-makes-bike-storage-a-snapp>.

"Two components that make your bike thin", accessed Mar. 26, 2015 (8 pages). <http://www.londoncyclist.co.uk/two-components-that-make-your-bike-thin/>.

speedlifter.com, accessed Mar. 26, 2015 (1 page). <http://www.pinterest.com/source/speedlifter.com>.

* cited by examiner

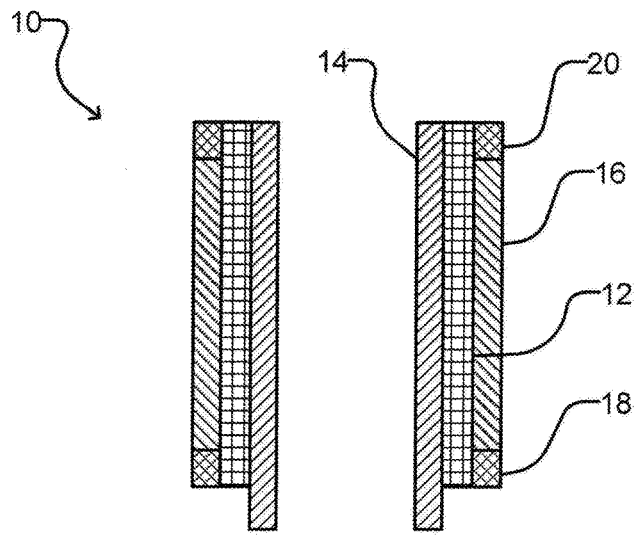
FIG. 2
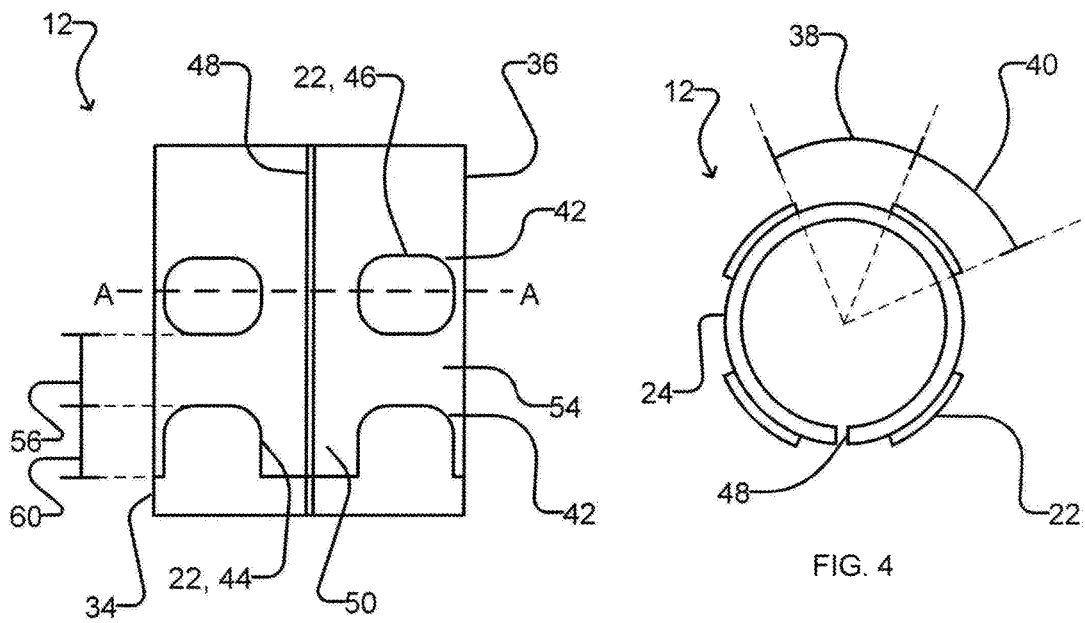
FIG. 3
FIG. 4

ROTATABLE BICYCLE STEM ASSEMBLY

TECHNICAL FIELD

This invention relates to a bicycle stem assembly.

BACKGROUND

Storage and transportation of bicycles challenging due to the perpendicular orientation of handlebars to the frame. Bicycles with handlebars that are rotatable, independently of the front wheel, so that they are parallel with the frame, are desirable.

SUMMARY

The inventions described herein have many aspects.

In one aspect, a rotatable stem assembly for a bicycle is provided. The assembly comprises: a tubular sleeve configured to fit over a steerer tube of the bicycle, an outer surface of the sleeve comprising a plurality of first splines and first channels; and a stem comprising a first bore for receiving the sleeve, the first bore comprising an inner surface comprising a plurality of second splines and second channels configured for mating engagement with the plurality of first splines and first channels; wherein the first and second splines and channels are matingly engageable in a riding configuration and in a storage configuration, wherein in the riding configuration the stem relative to the sleeve is rotationally perpendicular with the stem relative to the sleeve in the storage configuration.

At least one of the first channels may comprise a slot for abuttingly receiving a lower end of at least one of the second splines.

Radial dimensions of the first and second splines may be substantially equal to radial dimensions of the first and second channels. Circumferential angles of the first and second channels may be about 45 degrees, and circumferential angles of the first and second splines may be about 45 degrees.

Each of the first and second splines may comprise primary splines and secondary splines, wherein a gap height between the primary splines and secondary splines of the first splines may be substantially equal to a height of the secondary splines of the second splines.

The first and second splines may be dimensioned to provide a tight fit in their corresponding first and second channels. Respectively flared upper and lower portions of the first and second splines may provide the tight fit. The first and second splines may comprise rounded corners.

The sleeve may comprise a longitudinal slit. A lower collar may be provided for circumferentially tightening a lower portion of the sleeve around the steerer tube. An upper collar may be provided for circumferentially tightening an upper portion of the sleeve around the steerer tube. The upper collar may be adapted to retain the stem on the sleeve.

The lower collar and the lower portion of the sleeve may be releasably and lockingly engageable. A threaded connection or a pinch bolt connection may provide the releasable and lockable engagement. The threaded connection may comprise an interfering threaded fit. The lower collar and/or the lower portion of the sleeve may comprise beveled annular threaded surfaces.

The upper collar and the upper portion of the sleeve may be releasably and lockingly engageable. A threaded connection or a pinch bolt connection provide the releasable and lockable engagement.

The stem may comprise a second bore for receiving handlebars therethrough, wherein a longitudinal axis of the first bore is perpendicular to the longitudinal axis of the second bore, whereby in the riding configuration the handlebars are perpendicular to a frame of the bicycle and in the storage configuration the handlebars are parallel to the frame of the bicycle.

The stem may be integral with handlebars of the bicycle, wherein a longitudinal axis of the first bore is perpendicular to the longitudinal axis of the handlebars, whereby in the riding configuration the handlebars are perpendicular to a frame of the bicycle and in the storage configuration the handlebars are parallel to the frame of the bicycle.

In another aspect, a rotatable stem assembly for a bicycle is provided. The assembly comprises: a steerer tube comprising an upper portion comprising a plurality of first splines and first channels; and a stem comprising a first bore for receiving the upper portion, the first bore comprising an inner surface comprising a plurality of second splines and second channels configured for mating engagement with the plurality of first splines and first channels; wherein the first and second splines and channels are matingly engageable in a riding configuration and in a storage configuration, wherein in the riding configuration the stem relative to the steerer tube is rotationally perpendicular with the stem relative to the steerer tube in the storage configuration.

The foregoing discussion merely summarizes certain aspects of the inventions and is not intended, nor should it be construed, as limiting the inventions in any way.

BRIEF DESCRIPTION OF DRAWINGS

The accompanying drawings illustrate non-limiting example embodiments of the invention.

FIG. 2 is a sectional side view of the embodiment shown in FIG. 1 engaged with a steerer tube;

FIG. 3 is a side view of a sleeve of the embodiment shown in FIG. 1;

FIG. 4 is a sectional view of the sleeve of the embodiment shown in FIG. 1 taken along the plane A-A in FIG. 3;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 7A:
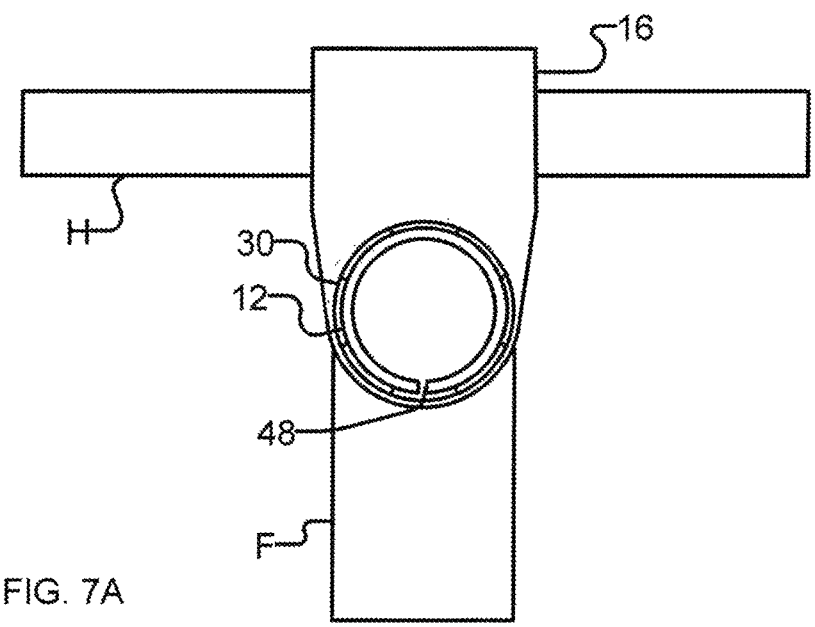
FIG. 7A is a rotatable bicycle stem assembly of the embodiment shown in FIG. 1 with handlebars and frame in a riding configuration.
Figure 7B:
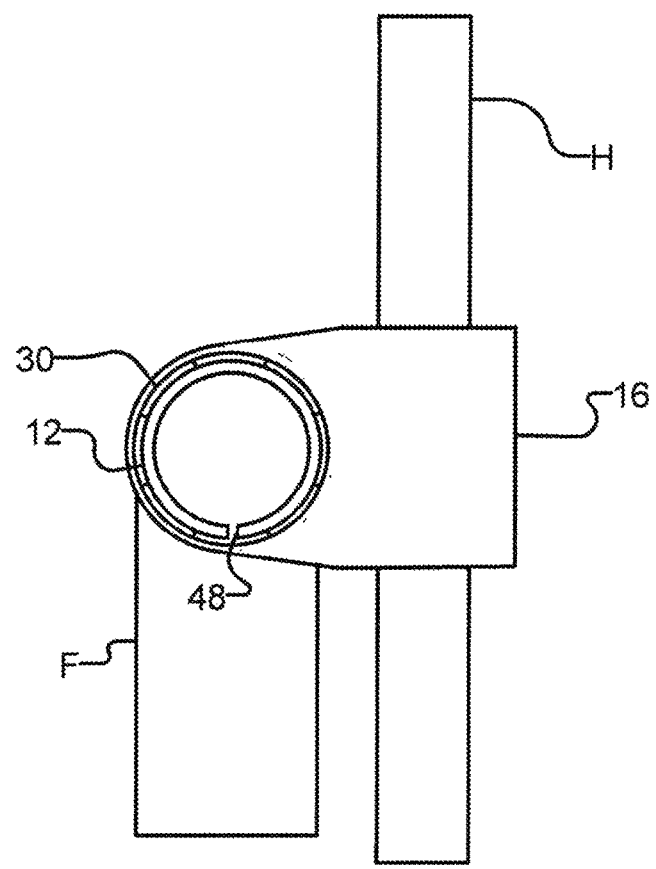
FIG. 7B is a rotatable bicycle stem assembly of the embodiment shown in FIG. 1 handlebars and frame in a storage configuration.

FIGS. 1 to 4 show a rotatable bicycle stem assembly 10 according to an embodiment. Assembly 10 includes a tubular sleeve 12 dimensioned to fit over a steerer tube 14 of a bicycle. At one end of stem 16 is a bore 30 that fits over sleeve 12 in a selectively mating manner such that the handlebars H can be configured in a riding configuration (as shown in FIG. 7A), wherein the handlebars H are transverse to the bicycle frame F, and a storage configuration (as shown in FIG. 7B), wherein the handlebars H are parallel to the bicycle frame F, as described in further detail herein. The other end of stem 16 is connected to the bicycle's handlebars H. In some embodiments stem 16 may have a bore 32 at this other end for receiving the handlebars H therethrough. In some embodiments the handlebars H may be integral with stem 16 at this other end.

An outer surface of sleeve 12 includes a plurality of circumferentially arranged first splines 22 separated by first channels 24. An inner surface of bore 30 includes a plurality of circumferentially arranged second splines 26 separated by second channels 28. First splines 22 and first channels 24 matingly engage with corresponding second splines 26 and second channels 28 as bore 30 is slid over sleeve 12. In some embodiments first splines 22 and second splines 26 may have rounded corners 42 to facilitate this mating engagement.

In some embodiments first splines 22 and first channels 24 are dimensioned to provide a tight fit with corresponding second splines 26 and second channels 28 to prevent relative rotation between stem 16 and sleeve 12. This tight fit may be facilitated by any suitable means, for example by flared upper and lower portions (not shown) of first splines 22 and second splines 26.

In some embodiments stem 16 full engages sleeve 12 when lower ends 52 of second splines 26 abut against spline receiving slots 50 of first channels 24. In some embodiments slots 50 and lower ends 52 have corresponding, mating profiles. In some embodiments, slots 50 are partially defined by a raised annular band comprising a lower portion 34 of sleeve 12.

In some embodiments, first splines 22 are matingly engageable with second channels 28, and second splines 26 are matingly engageable with first channels 24, in at least a riding configuration and in a storage configuration. In some embodiments, the first splines 22 are matingly engageable with second channels 28, and second splines 26 are matingly engageable with first channels 24, only in a riding configuration and in a storage configuration.

As shown in FIG. 3, each first spline 22 comprises a primary spline 44 and a secondary spline 46. A gap 54 with a gap height 56 is defined between primary spline 44 and secondary spline 46. Gap height 56 is substantially equal to height 58 of a primary spline 45 of second splines 26. This correspondence between gap height 56 and height 58 of primary spline 45 permits a user to lift stem 16 upward only by a height 60 of primary splines 44 of first splines 22, upon which primary splines 45 of second splines 26 can be slid through gap 54 by rotation of stem 16 relative to sleeve 12. Once stem 16 is rotated ninety degree relative to sleeve 12 (for example from the riding configuration to the storage configuration, or vice versa), then stem 16 can be lowered onto sleeve 12, with first splines 22 matingly engaging different second channels 28, and second splines 26 matingly engaging different first channels 24, until lower ends 52 of second splines 26 abut against different slots 50 of first channels 24.

In some embodiments, the first and second splines may each comprise a single body instead of being of being split into primary and secondary splines; in such embodiments the user will need to lift the stem upward relative to the sleeve by a height sufficient to clear the height of the entire spline before rotating the stem. In some embodiments, the splines are of any suitable configuration and shape capable of matingly engaging the channels. For example, in some embodiments each spline, instead of a single body, may instead consist of an array of closely arranged raised elements that in combination effectively act as a single spline (or a primary spline and a secondary spline) that matingly engages with a corresponding channel.

As shown in FIG. 4, a radial dimension 38 of first channel 24 is substantially equal to a radial dimension 40 of first spline 22. Likewise, a radial dimension of second channel 28 is substantially equal to a radial dimension of second spline 26. In some embodiments, the radial dimensions of first spline 22, first channel 24, second spline 26 and second channel 28, are each about 45 degrees to allow 90 degree rotations of stem 16 relative to sleeve 12. In some embodiments, the radial dimensions of the splines and the channels may not be the same but still be configured to provide for 90 degree rotations of the stem relative to the sleeve.

In some embodiments the fit between sleeve 12 and steerer tube 14 may be a sliding fit. In some the fit between sleeve 12 and steerer tube 14 may be a running fit.

As shown in FIG. 2, sleeve 12 is secured to steerer tube 14 by a lower collar 18 and an upper collar 20. A longitudinal slit 48 extends the full length of sleeve 12. In some embodiments, longitudinal slit 48 may extend less than the full length of sleeve 12. In some embodiments sleeve 12 has longitudinal slit 48 but otherwise has no other openings or apertures along its length, in order to provide as much surface area as possible for translation of torsional force between stem 16 and steerer tube 14.

Lower collar 18 tightens around a lower portion 34 of sleeve 12 with sufficient force to pinch in longitudinal slit 48, which in turn results in lower portion 34 tightening around steerer tube 14. In some embodiments engagement of lower collar 18 to lower portion 34 is a releasable and lockable engagement, for example by a threaded connection, pinch bolt connection or other suitable means. In some embodiments the fit between lower collar 18 and lower portion 34 may be an interference fit. An interference fit may be provided, for example, by threaded surfaces of lower collar 18 and/or lower portion 34 having beveled surfaces. Interference fit between lower collar 18 and lower portion 34 facilitates tightening of sleeve 12 to steerer tube 14.

Figure 1:
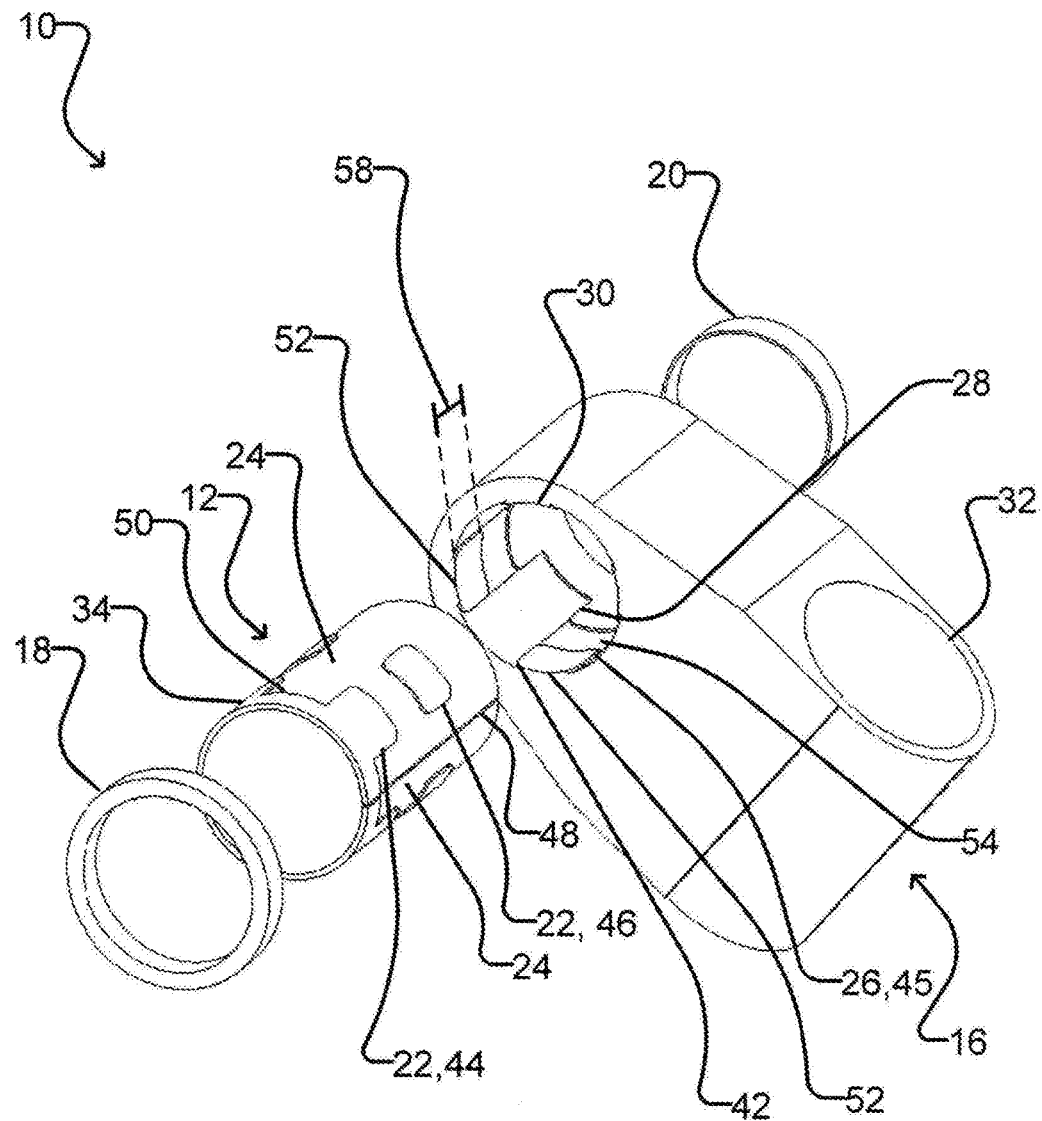
FIG. 1 is an isometric exploded view of a rotatable bicycle stem assembly according to an embodiment.
Figure 5:
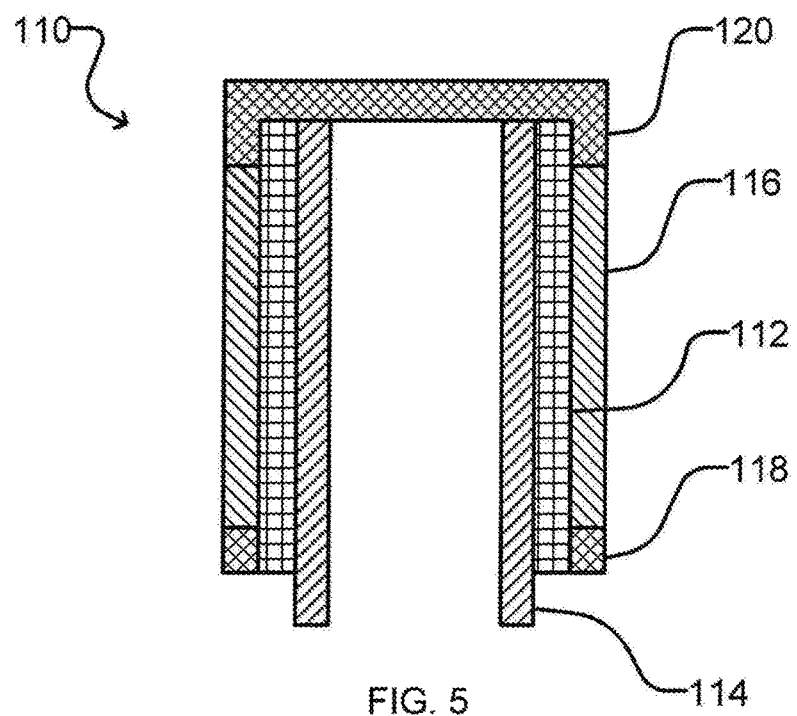
FIG. 5 is a sectional side view of a rotatable bicycle stem assembly according to another embodiment.

Similarly, upper collar 20 tightens around an upper portion 36 of sleeve 12, which in turn tightens around steerer tube 14 as longitudinal slit 48 pinches in. In some embodiments engagement of upper collar 20 to upper portion 36 is a releasable and lockable engagement, for example by a threaded connection, pinch bolt connection or other suitable means. Upper collar 20 also retains stem 16 on sleeve 12 by providing a downward force against stem 16. As shown in FIG. 5, in some embodiments such as assembly 110, a cap 120 may be provided in place of, and perform the same functions of, upper collar 20.

Figure 6:
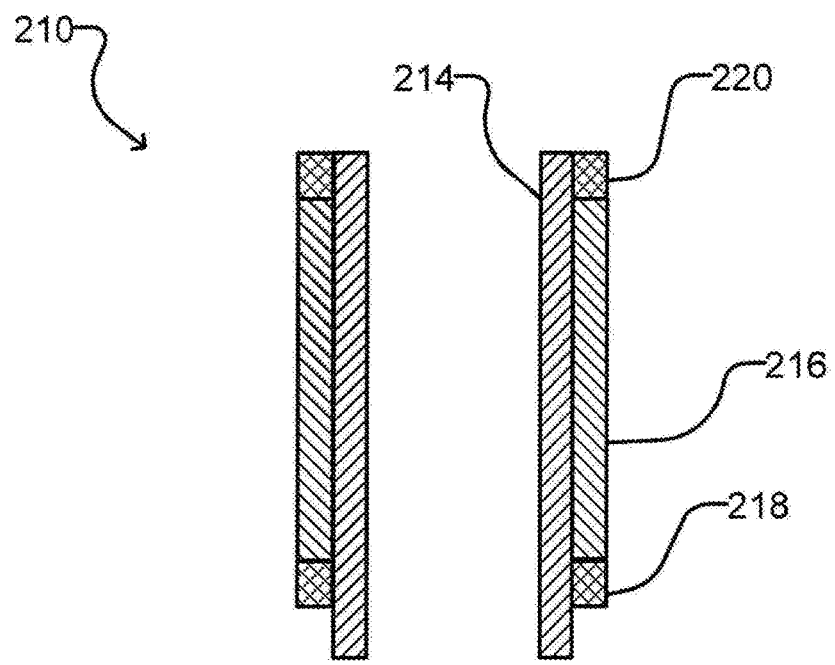
FIG. 6 is a sectional side view of a rotatable bicycle stem assembly according to another embodiment.

In some embodiments, sleeve 12 may be fixed to steerer tube 14 by other suitable means that ensure a secure connection between them. In some embodiments, for example, sleeve 12 may comprise two separate semi-tubular elements that are closed around steerer tube 14 by collars similar to lower collar 18 and upper collar 20, wherein the semi-tubular elements joined together define an inner circumference somewhat less than the outer circumference of steerer tube 14. In some embodiments sleeve 12 and steerer tube 14 may be directly secured to each other by any suitable interference fit. In some embodiments, such as in assembly 210 shown in FIG. 6, the sleeve may be absent altogether and splines and channels (not shown) of stem 216 may matingly engage with splines and channels (not shown) of steerer tube 14, in a manner similar to how splines 26 and channels 28 of stem 16 matingly engage splines 22 and channels 24 of sleeve 12.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A rotatable stem assembly for a bicycle comprising
   a tubular sleeve configured to fit over a steerer tube of the bicycle, an outer surface of the sleeve comprising a plurality of first splines and first channels; and
   a stem comprising a first bore for receiving the sleeve, the first bore comprising an inner surface comprising a plurality of second splines and second channels configured for mating engagement with the plurality of first splines and first channels;
   wherein the first and second splines and channels are matingly engageable in a riding configuration and in a storage configuration, wherein in the riding configuration the stem relative to the sleeve is rotationally perpendicular with the stem relative to the sleeve in the storage configuration.

2. A rotatable bicycle stem assembly according to claim 1, wherein at least one of the first channels comprises a slot for abuttingly receiving a lower end of at least one of the second splines.

3. A rotatable bicycle stem assembly according to claim 1, wherein radial dimensions of the first and second splines are substantially equal to radial dimensions of the first and second channels.

4. A rotatable bicycle stem assembly according to claim 3, wherein circumferential angles of the first and second channels are about 45degrees, and wherein circumferential angles of the first and second splines are about 45 degrees.

5. A rotatable bicycle stem assembly according to claim 1 wherein each of the first and second splines comprise primary splines and secondary splines, wherein a gap height between the primary splines and secondary splines of the first splines is substantially equal to a height of the secondary splines of the second splines.

6. A rotatable bicycle stem assembly according to claim 5 wherein the first and second splines comprises rounded corners.

7. A rotatable bicycle stem assembly according to claim 1, wherein the sleeve comprises a longitudinal slit.

8. A rotatable bicycle stem assembly according to claim 7 comprising a lower collar for circumferentially tightening a lower portion of the sleeve around the steerer tube.

9. A rotatable bicycle stem assembly according to claim 8 comprising an upper collar for circumferentially tightening an upper portion of the sleeve around the steerer tube.

10. A rotatable bicycle stem assembly according to claim 9 wherein the upper collar is adapted to retain the stem on the sleeve.

11. A rotatable bicycle stem assembly according to claim 8 wherein the lower collar and the lower portion of the sleeve are releasably and lockingly engageable.

12. A rotatable bicycle stem assembly according to claim 11 wherein a threaded connection or a pinch bolt connection provide the releasable and lockable engagement.

13. A rotatable stem assembly for a bicycle comprising
    a steerer tube comprising an upper portion comprising a plurality of first splines and first channels; and
    a stem comprising a first bore for receiving the upper portion, the first bore comprising an inner surface comprising a plurality of second splines and second channels configured for mating engagement with the plurality of first splines and first channels;
    wherein the first and second splines and channels are matingly engageable in a riding configuration and in a storage configuration, wherein in the riding configuration the stem relative to the steerer tube is rotationally perpendicular with the stem relative to the steerer tube in the storage configuration.

14. A bicycle comprising:
    a frame;
    handlebars; and
    a rotatable bicycle stem assembly according to claim 1 for coupling the handlebars to the frame.

15. A bicycle according to claim 14 wherein the stem comprises a second bore for receiving handlebars therethrough, wherein a longitudinal axis of the first bore is perpendicular to the longitudinal axis of the second bore, whereby in the riding configuration the handlebars are perpendicular to the frame and in the storage configuration the handlebars are parallel to the frame.

16. A bicycle according to claim 14 wherein the stem is integral with handlebars of the bicycle, wherein a longitudinal axis of the first bore is perpendicular to the longitudinal axis of the handlebars, whereby in the riding configuration the handlebars are perpendicular to the frame and in the storage configuration the handlebars are parallel to the frame.

* * * * *